United States Patent
Momoki

(10) Patent No.: US 9,864,107 B2
(45) Date of Patent: Jan. 9, 2018

(54) OPTICAL ELEMENT WITH ANTIREFLECTION FUNCTION AND OPTICAL APPARATUS INCLUDING THE SAME

(75) Inventor: Kazuhiko Momoki, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 890 days.

(21) Appl. No.: 13/230,074

(22) Filed: Sep. 12, 2011

(65) Prior Publication Data

US 2012/0062995 A1    Mar. 15, 2012

(30) Foreign Application Priority Data

Sep. 14, 2010  (JP) .................................. 2010-205284

(51) Int. Cl.
| | | |
|---|---|---|
| G02B 27/00 | (2006.01) | |
| G02B 1/115 | (2015.01) | |
| G02B 5/04 | (2006.01) | |
| G02B 1/118 | (2015.01) | |
| G02B 5/28 | (2006.01) | |

(52) U.S. Cl.
CPC .............. *G02B 1/115* (2013.01); *G02B 1/118* (2013.01); *G02B 5/045* (2013.01); *G02B 5/285* (2013.01)

(58) Field of Classification Search
CPC . G02B 1/10; G02B 1/105; G02B 1/11; G02B 1/115; G02B 1/118; G02B 5/04; G02B 5/045; G02B 5/28; G02B 26/00; G02B 26/08; G02B 26/0875; G02B 26/0883; G02B 27/0018; G02B 5/285

USPC .................................................. 359/599, 601
See application file for complete search history.

(56) References Cited

U.S. PATENT DOCUMENTS

| | | | | |
|---|---|---|---|---|
| 6,424,436 | B1 * | 7/2002 | Yamanaka | G02B 5/1833 235/462.01 |
| 7,108,810 | B2 * | 9/2006 | Nakamura et al. | 264/1.7 |
| 2002/0089750 | A1 * | 7/2002 | Hoshi | G02B 1/11 359/566 |
| 2004/0223220 | A1 * | 11/2004 | Kawanishi et al. | 359/485 |
| 2004/0224187 | A1 * | 11/2004 | Kang et al. | 428/697 |

(Continued)

FOREIGN PATENT DOCUMENTS

| | | |
|---|---|---|
| JP | 11-305005 A | 11/1999 |
| JP | 2001-272505 A | 10/2001 |

(Continued)

*Primary Examiner* — Thong Nguyen
(74) *Attorney, Agent, or Firm* — Rossi, Kimms & McDowell LLP

(57) ABSTRACT

An optical element having antireflection function includes a substrate including a first relief structure, which includes a plurality of convexes and a plurality of concaves arrayed with a pitch of at most a half of a wavelength λ. A thin film layer including at least one thin film on the first relief structure. The at least one thin film each has a refractive index lower than a refractive index of the substrate. The optical element satisfies the following conditional expression: $1/4 \leq h1/h0 \leq 2$ and $1/5 \lambda \leq D \leq 2\lambda$, where h0 represents a first height difference between a top and a bottom of the first relief structure in a normal direction of a bottom plane of the first relief structure, h1 represents a second height difference between a top and a bottom of the second relief structure in the normal direction, D represents a maximum thickness of the thin film layer, and the wavelength λ is 550 nm.

14 Claims, 12 Drawing Sheets

(56) References Cited

U.S. PATENT DOCUMENTS

| | | |
|---|---|---|
| 2004/0240070 A1* | 12/2004 | Suzuki et al. ................ 359/599 |
| 2006/0001969 A1* | 1/2006 | Wang et al. .................. 359/494 |
| 2008/0042926 A1 | 2/2008 | Egi et al. |
| 2009/0190225 A1 | 7/2009 | Yamada et al. |

FOREIGN PATENT DOCUMENTS

| | | |
|---|---|---|
| JP | 2005-070435 A | 3/2005 |
| JP | 2008-009408 A | 1/2008 |
| JP | 2008203473 A | 9/2008 |
| WO | 2008/001662 A1 | 1/2008 |

* cited by examiner

OPTICAL ELEMENT WITH ANTIREFLECTION FUNCTION AND OPTICAL APPARATUS INCLUDING THE SAME

BACKGROUND OF THE INVENTION

1. Field of the Invention

The present invention relates to an optical element having the antireflection function and an optical apparatus including the optical element.

2. Description of the Related Art

Conventionally, as antireflection structure on the surface of an optical system, along with an antireflection film using the interference in dielectric multilayer films, an antireflection structure using fine relief structure of at most the wavelength is known. This utilizes a characteristic where light reacts in the fine relief structure of at most the wavelength as layers having homogenous effective refractive index. The effective refractive index for the fine relief structure or porous structure is regarded as an average refractive index which includes refractive indexes of medium and air.

Therefore, if the fine relief structure is constituted so that the density of the medium lowers form the substrate interface toward air, the effective refractive index gradually lowers from a substrate interface toward the air. This inclination of the refractive index drastically reduces the reflection on the interface.

However, the antireflection structure using the fine relief structure has a weak point where the manufacture is difficult by the fineness thereof.

For example, Japanese Patent Laid-Open No. 2001-272505 discloses a surface treatment method of forming a taper shape having a large aspect ratio for the antireflection on an optical element.

This method forms a metallic mask having a dot array shape for the optical substrate and etches the optical substrate itself, and in the etching, gradually reduces the diameter of the metallic mask to form the taper shape. Japanese Patent Laid-Open No. 2001-272505 further discloses that a similar processing is given on a metal mold, and an optical element is formed by the metal mold.

On the other hand, Japanese Patent Laid-Open No. 2005-70435 has a shape similar to the present invention, and discloses a structure where reliefs are formed on a surface of a substrate, and antireflection multilayer film is formed on the reliefs. The manufacture thereof seems to be easy because the reliefs of the surface of the substrate have a shallow depth compared with the pitch, and its aspect ratio is small.

However, the technical art disclosed in Japanese Patent Laid-Open No. 2001-272505 uses complex processes, such as the formation of the metallic mask and the etching, in the manufacture of the relief structure on the substrate, and therefore is inept in quantity production for consumer productions in a cost. The molding is difficult because the aspect ratio is high, and the increase of the molding takt and the lowering of non-defective product rate may be caused.

On the other hand, in Japanese Patent Laid-Open No. 2005-70435, since the pitch of the reliefs is 2~100 μm more than the wavelength, the substrate is different from the fine relief shape and cannot be treated as homogeneous effective refractive index in the surface even by approximation. Since the relief shape is sufficiently large as compared to the wavelength, the diffractive scattering is caused on the surface. In the first place, the conventional art purposes the antiglare, its range of use is limited to proximity of a display surface of an monitor apparatus and the like, and therefore it cannot be used in, for example, a surface of an image-pickup lens in an imaging system. The thin film formed in the relief shape merely has the performance as a normal multilayer film, and the improvement of the angle characteristic is not expected

SUMMARY OF THE INVENTION

The present invention provides an optical element which has antireflection function and enables easy manufacture while having a characteristic similar to an antireflection structure which includes fine reliefs having a frequency of at most the wavelength.

An optical element as one aspect of the present invention includes a substrate including a first relief structure on a surface. The first relief structure a plurality of convexes and a plurality of concaves arrayed with a pitch of at most a half of a wavelength λ. It also includes a thin film layer including at least one thin film on the first relief structure. The thin film layer has a refractive index lower than the refractive index of the substrate. A thin film closest to a side of air, among the at least one the thin film, includes a second relief structure corresponding to the first relief structure. Among the at least one thin film, only a thin film closest to a side of the substrate exists between the plurality of convexes in the first relief structure. The following conditional expression is satisfied:

$$1/4 \leq h1/h0 \leq 2 \quad (1), \text{ and}$$

$$1/5\lambda \leq D \leq 2\lambda \quad (2)$$

where h0 represents a first height difference between the top and a bottom of the first relief structure in the normal direction, h1 represents a second height a difference between a top and a bottom of the second relief structure in the normal direction, D represents a maximum thickness of the thin film layer, and the wavelength λ is 550 nm.

Further features and aspects of the present invention will become apparent from the following description of exemplary embodiments with reference to the attached drawings.

DESCRIPTION OF THE PREFERRED EMBODIMENTS

Figure 1:
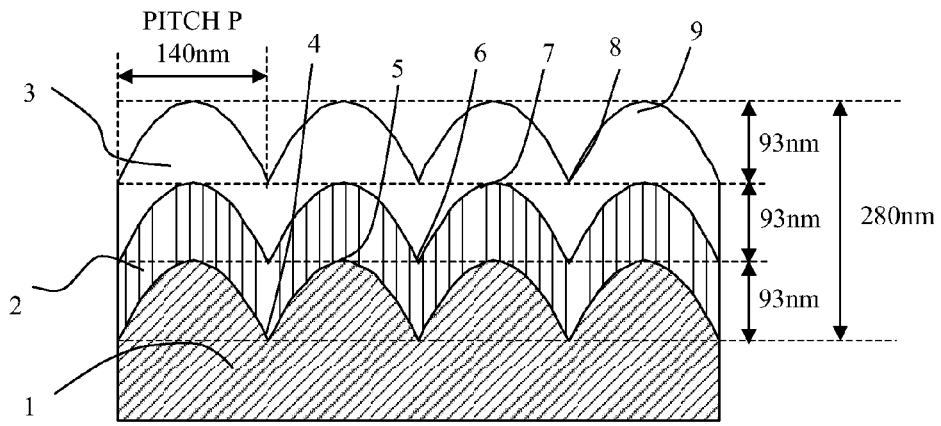
FIG. 1 illustrates an antireflection structure of embodiment 1.

The preferred embodiments of the present invention will be hereinafter described in detail with reference to the accompanying drawings. FIG. 1 illustrates an antireflection structure related to embodiments of the present invention.
[Embodiment 1]

Hereinafter, an antireflection structure in embodiment 1 of the present invention is described with reference to FIG. 1.

FIG. 1 illustrates a section view of the antireflection structure of an optical element (antireflection element) having an antireflection function of the present invention. This is a structure where thin films 2 and 3 are layered on a relief structure (first relief structure) formed on a surface of a substrate 1.

Figure 4:
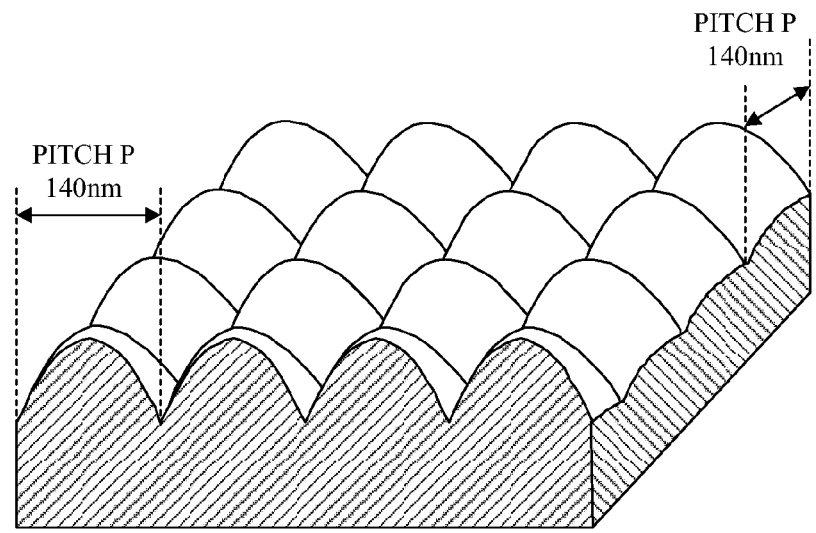
FIG. 4 is a schematic diagram illustrating a relief structure of the substrate of embodiment 1.

The relief structure is provided in the substrate 1 with a frequency of at most the wavelength as illustrated in FIG. 4. In embodiment 1, the wavelength λ of light irradiated to the antireflection element is 550 nm. However, in the present invention, the wavelength of irradiated light is not limited to 550 nm. When forming the relief structure, it is also possible to use a mold. The thin film 2 is formed on the relief structure of the substrate 1 so that the film thickness is uniform. In the formation of film, a sputtering film formation and the like may be used instead of a normal evaporation. The sputtering film formation apparatus is assumed to cause the evaporation and the etching at the same time when forming a film. Adjusting the film forming condition of the apparatus, that is to say, controlling a balance between the evaporation and the etching enables a thin film interface to be formed to the shape similar to the substrate 1, which is ground.

Similarly, a thin film 3 is formed on the thin film 2 so that the film thickness is uniform.

Table 1 represents designed values of embodiment 1. The substrate 1 is a medium having the refractive index 1.84, and the surface thereof forms reliefs where the pitch is 140 nm and the height is 93 nm (in fact the height is 93.3 nm, but is regarded as 93 nm by rounding off it to the 1). The thin film 2 which has the thickness equal to the height of the reliefs of the substrate 1 and has the refractive index 1.60 is formed on the relief structure of the substrate 1. Here, the height of the reliefs of the substrate 1 means the difference, in the normal direction of the surface of the substrate, between a top 5 of convexes and a bottom 4 of concaves which is the closest to the top 5 of the convexes.

The thin film 2 having the thickness of 93 nm (in fact the thickness is 93.3 nm, but is regarded as 93 nm by rounding off it to the 1) is formed on the relief structure of the substrate 1, and the top 5 of the convexes of the relief structure of the substrate 1 and a bottom 6 of concaves of the interface in the upper side of the thin film 2 are on the same level. Moreover, the height of the reliefs of the interface in the upper side of the thin film 2 is 93 nm and is the same as the substrate 1.

Figure 5:
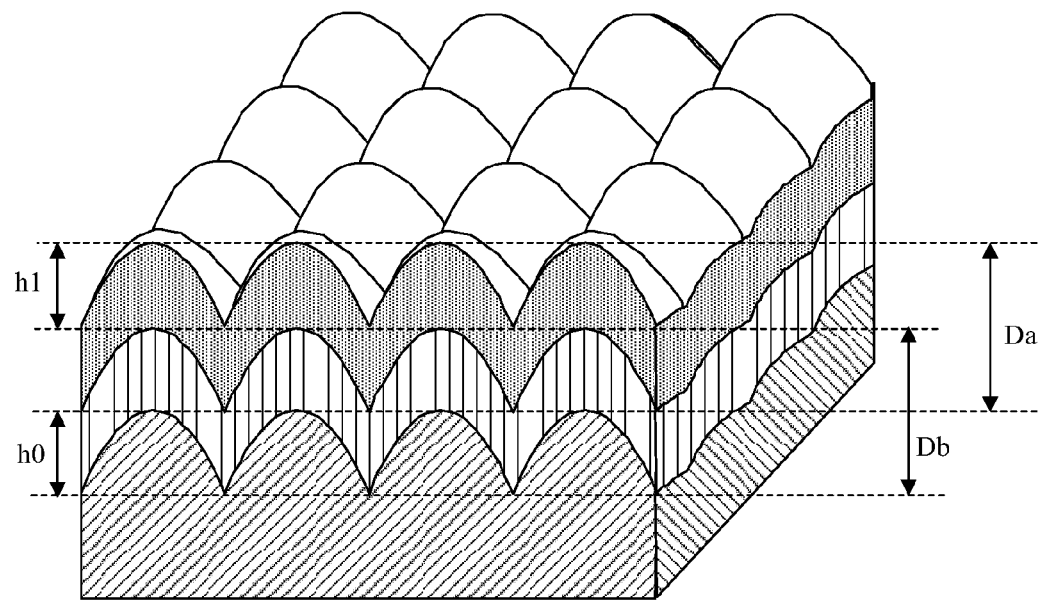
FIG. 5 is a schematic diagram illustrating a relief structure of the antireflection structure of embodiment 1.

Similarly, the thin film 3 having the refractive index 1.25 is formed on the reliefs of the thin film 2 by the thickness 93 nm (in fact the height is 93.3 nm, but is regard as 93 nm by rounding off it to the 1). A top 7 of convexes of the thin film 2 and a bottom 8 of concaves of the interface in the upper side of the thin film 3 are on the same level. Moreover, as illustrated in the schematic diagram of FIG. 5, the relief structure (second relief structure) of the interface in the upper side of the thin film 3, being the uppermost layer, has the same shape as the reliefs of the substrate 1, and the height is 93 nm equal with the height of the reliefs of the substrate 1.

As illustrated in the section view of FIG. 1, the total thickness form the bottom 4 of the concaves of the relief structure of the substrate 1 to a top 9 of convexes of the reliefs of the interface in the upper side of the thin film 3 are 280 nm (in fact, the height is 279.9 nm, but is regard as 280 nm by rounding off it to the 1). In a conventional antireflection structure, the reliefs having the height (about 280 nm) about at least 1/2λ of the wavelength of irradiated light are required for the pitch of 140 nm or less, and the aspect ratio about 2 is required.

Therefore, in the present invention, the height from the bottom 4 of the concaves of the relief structure of the substrate to the top 9 of the convexes of the interface in the upper side of the thin film layer closest to air need to be about 280 nm. Each layer can be assumed as mixed layers where the ratio of medium changes gradually with advancing from the substrate side in the thickness direction. When a plurality of mediums is arranged with the frequency of at most the irradiated wavelength, it can be treated as a layer which has a homogeneous refractive index depending on the ratio of those mediums. The refractive index is called as "effective refractive index", and can be simulated by the approximation of the interference in a multilayer film using thin film calculation software.

Figure 2:
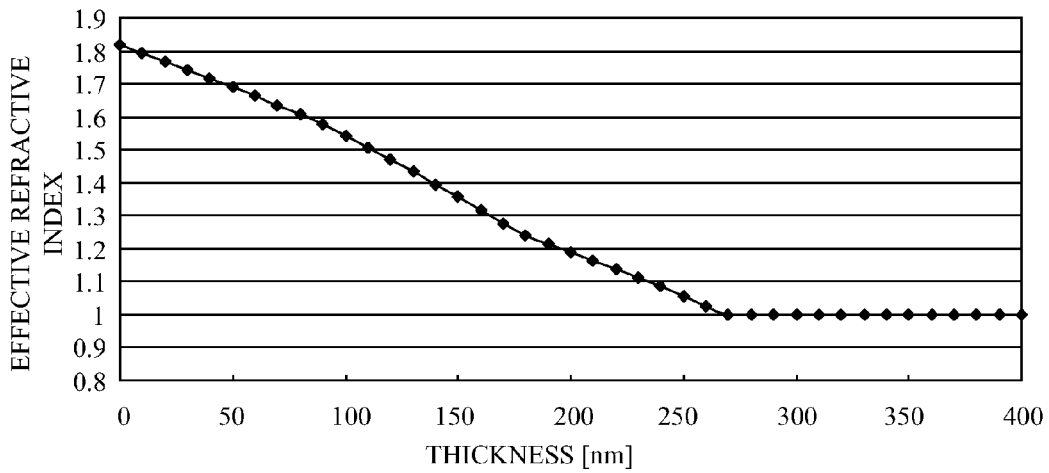
FIG. 2 illustrates an antireflection structure of a numerical example 1 of the present invention.

FIG. 2 is a refractive index profile that indicates the effective refractive index in the thickness direction of the substrate with respect to this antireflection structure. The thickness is set in the horizontal axis, and it is plotted by expediently defining as 0 nm the position which is on the same thickness as the bottom 4 of the concaves of the relief structure of the substrate 1. The effective refractive index is set in the vertical axis.

In a position which is on the same thickness as the bottom 4 of the concaves of the relief structure of the substrate 1, that is, a position which is 0 nm in thickness, the medium of the substrate 1 accounts for 100% in the pitch direction, and the effective refractive index is 1.84.

In a position which is on the same thickness as the bottom 6 of the concave of the interface in the upper side of the thin film 2 or as the top 5 of the convexes of the substrate 1, that is, a position which is 93 nm in thickness, since the medium of the thin film accounts for 100% in the pitch direction, the effective refractive index is 1.60.

The occupancy rate of the mediums of the substrate 1 and the thin film 2 in the pitch direction gradually changes between the thickness 0 nm and 93 nm. From the substrate side toward the air side, the occupancy rate of the medium of the substrate 1 falls, the occupancy rate of medium of the thin film 2 rises, and the effective refractive index also gradually changes depending on the change of the occupancy rate.

Similarly, in a position which is on the same thickness as the bottom 8 of the concaves of the interface in the upper side of the thin film 3 or as the top 7 of the convexes of the interface in the upper side of thin film 2, that is, a position which is 187 nm in thickness (in fact, the thickness is 186.6 nm, but is rounded off it to the 1), since the medium of the thin film 3 accounts for 100% in the pitch direction, the effective refractive index is 1.25. Between the thickness 93 nm and 187 nm, the occupancy rates of the mediums of the thin film 2 and the thin film 3 gradually change in the pitch direction, and the effective refractive index also gradually changes.

Moreover, in a position which is on the same thickness as the top 9 of the convexes of the interface in the upper side of the thin film 3 for the bottom 4 of the concaves of the relief structure of the substrate 1, that is, a position which is 280 nm in thickness, since air accounts for 100% in the pitch direction, the effective refractive index is 1.00. Between the thickness 187 nm and 280 nm, the effective refractive index changes depending on the increase of the occupancy rate of air in the pitch direction, and finally it becomes the refractive index of air.

Viewed as a whole, the graph illustrates that, from the substrate side toward the air side, the effective refractive index gradually changes from the refractive index of the substrate 1 to the refractive index of air.

Figure 3:
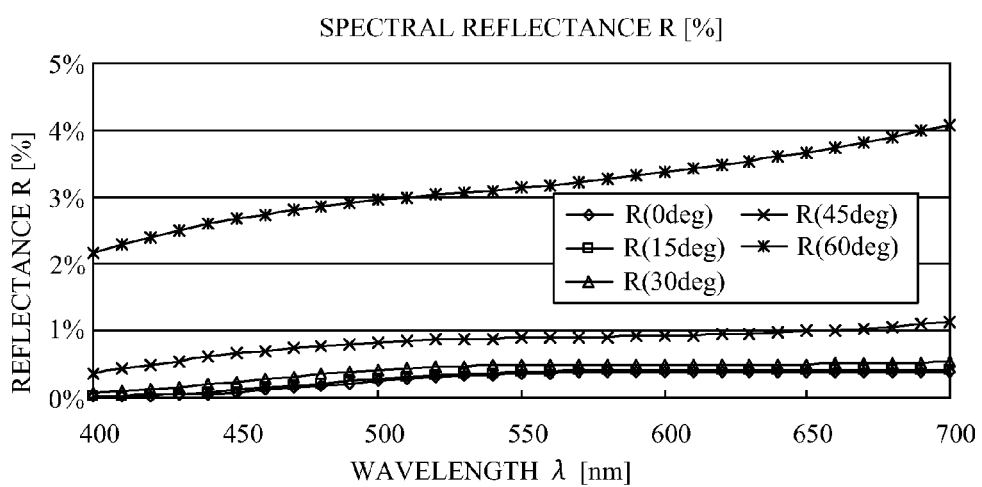
FIG. 3 is a graph illustrating calculation values of the spectral reflectance of the numerical example 1 of the present invention.

On the basis of this refractive index profile, the result where spectral reflectance is simulated as the multilayer interference is illustrated as the graph of FIG. 3. In incident angle 0-30°, a low reflectance of 0.5% or less is achieved in the whole range of visible light. Moreover, the reflectance of about 3% in the proximity of 550 nm is achieved in a high incident angle of 60°.

The following is described by using the comparison numerical example while comparing it with embodiment 1.

Figure 6:
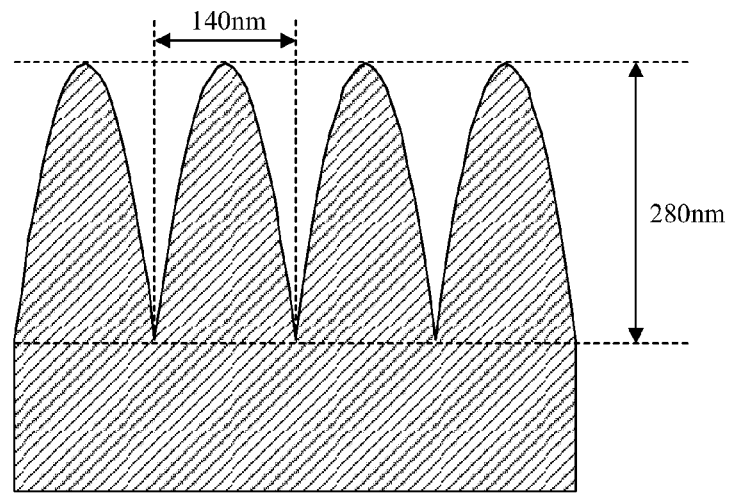
FIG. 6 illustrates an antireflection structure of a comparative example.

FIG. 6 illustrates a section view of the antireflection structure used as a comparison numerical example.

Figure 7:
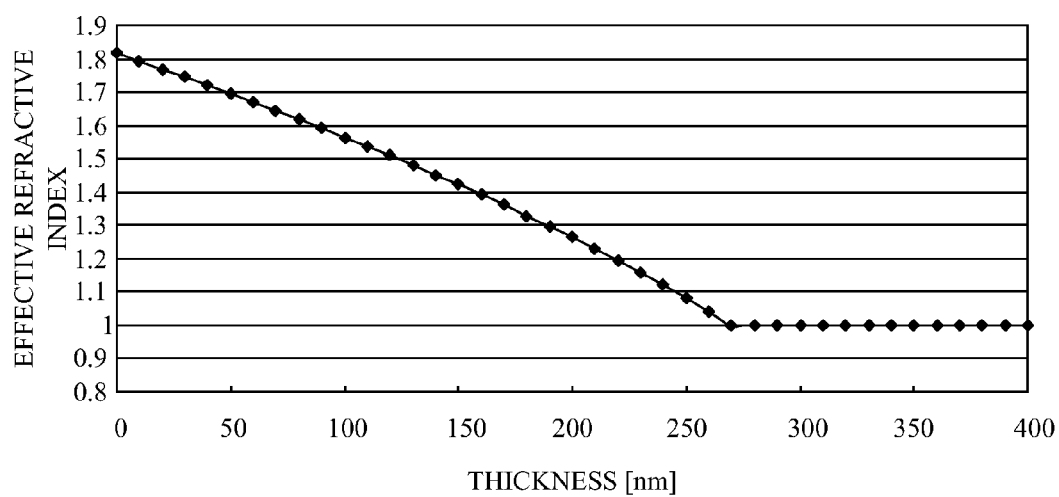
FIG. 7 illustrates a refractive index structure of the comparative example.
Figure 8:
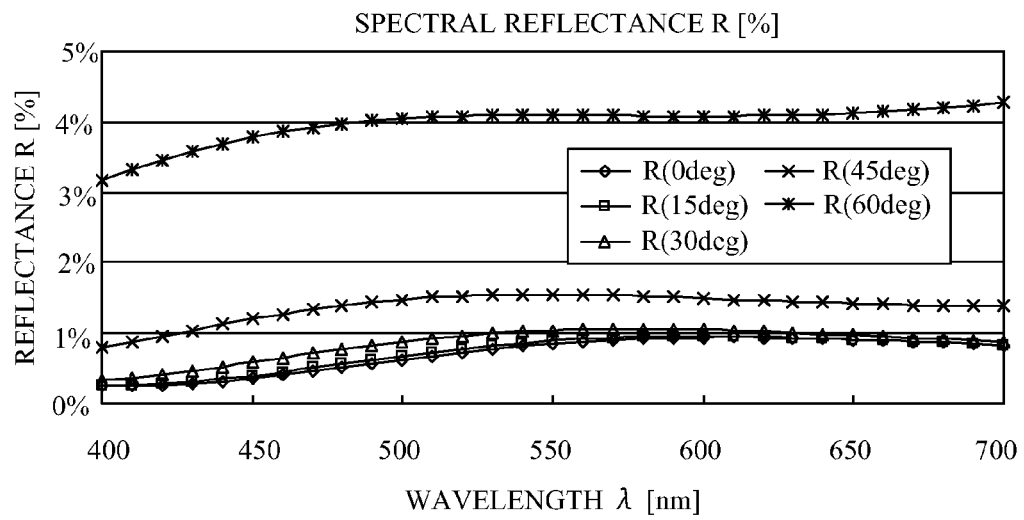
FIG. 8 is a graph illustrating calculation values of the spectral reflectance of the comparative example.

FIG. 7 illustrates the refractive index profile of this comparison numerical example. This has the same shape as the refractive index profile of embodiment 1 represented in FIG. 2, the refractive index is gradually changed from the refractive index 1.84 of the substrate toward the refractive index 1.00 of air. FIG. 8 is a graph illustrating the result of the simulation of the spectral reflectance in the comparison numerical. The spectral reflectance performance is in the same range as embodiment 1.

The structure to achieve this comparison numerical example forms the relief structure on the substrate as illustrated in FIG. 6. The refractive index of the medium of the substrate is 1.84, and the reliefs having the pitch of 140 nm and the height of 280 nm are formed. The shape of the reliefs is considerably shape, and the aspect ratio of the reliefs (the ratio of height to the pitch) is 2 high. Therefore, the difficulty in manufacturing is high.

In plastic molding, glass molding and the like where molding is performed using molds, in molding of the shape of a lens, it seems to be ideal to make the fine structure at the same time as the molding. In the plastic molding where a molding temperature is relatively low, molding of the above shape is partway possible, but since its forming condition is difficult, the increase of cost caused by the increase of forming time is concerned. As to the forming condition, since a condition where a transfer performance of the fine structure is secured and a condition required in molding of whole shape of lens may not be achieved at the same time, the molding is impossible in this case.

In the glass molding where high molding temperature is required, it is impossible to mold a shape having the aspect ratio about 2 with this size at present.

In embodiment 1, the relief structure is provided with frequency of at most the wavelength in the substrate 1 as illustrate in FIG. 4. The pitch is defined as 140 nm to prevent scattering due to diffraction. Therefore, it is required that the pitch is not more than half of the shortest wavelength in the used wave length region. It is preferred to be set about 140 nm considering the variation of the relief shape and the like.

In embodiment 1, two thin film layers 2 and 3 respectively having the refractive indexes of 1.60 and 1.25 are formed on the reliefs of the substrate 1. The values of these refractive indexes are set to fill in a gap by dividing the gap between the refractive index 1.84 of the substrate 1 and the refractive index 1.00 of air about equally among three. These thin film layers are arranged in order of gradually decreasing the refractive index from substrate 1. The refractive index gradient is efficiently formed by forming the thin film layers 2 and 3 on the reliefs in the order.

The thickness in one thin film layer decreases as the number of layers of these thin films is increased, and height necessary for the reliefs on the surface of the substrate can be decreased at the same time.

However, since there is no medium capable of freely selecting refractive index in the middle, it is desirable to configure the thin film layer, which is provided on the relief structure of the substrate, by about 1-2 layers.

The following conditional expression defines a ratio of h0 and h1 by defining as the height h0 the difference between a top of the convexes of the relief structure of the substrate and a bottom of the concaves closest to this top in the relief structure of the substrate and by defining as height h1 the difference between a top of the convexes of the relief structure of a thin film being the uppermost layer and a bottom of the concaves closest to this top in the relief structure of the thin film. In embodiment 1, both h0 and h1 are 93 nm, and the medium part of the condition expression becomes 1. The relief structure of the substrate has an impact to the uppermost layer of the thin films, and these are designed with the same shape. In some condition, the impact of the shape of the substrate is reduced. Even in the case, the same effect as the present invention can be provided by being set not to exceed the lower limit. In contrast, in order to improve the molding performance by low suppressing the aspect ratio of the substrate, it is possible to make the value of conditional expression (1) exceeding 1 by devising the film forming condition. However, the intensity of the thin film layer can be prevented from decreasing by being set not to exceed the value of the upper limit in that case.

$$1/4 \leq h1/h0 \leq 2 \tag{1}$$

The following conditional expression (2) defines the maximum thickness D of the thin film layer formed on the relief structure of the substrate. When the thin film layer consists of two or more thin films, the total thickness is defined as D. Moreover, the total thickness of the thin film is defined in a position of the maximum thickness. In other words, in FIG. 5, the D is the maximum value among the difference Da between the top of the convexes of the relief structure of the substrate and the top of the convexes of the relief structure of the thin film in the uppermost layer and the difference Db between the bottom of the concaves of the relief structure of the substrate and the bottom of the concaves of the relief structure of the thin film in the uppermost layer. In embodiment 1, the thin film layer 2 has 93 nm, the thin film layer 3 has 93 nm, the total thickness D is 187 nm, and the conditional expression is satisfied. When the thin film layer consists of one layer, as after-mentioned embodiment 3, the relief structure and the thickness of each thin film layer will be adjusted to about 1/4λ to obtain the structure where the height from the bottom of the concaves of the substrate having the relief structure to the top of the convexes of the interface in the upper side of the thin film is 1/2 λ.

Since the thickness of this thin film layer is defined as the lower limit, if the number of thin film layers is increased, the thickness of the thin film layer increases. When the maximum thickness of the thin film layer has thinness exceeding the lower limit of the conditional expression, a sufficient antireflection performance cannot be acquired. Moreover, the aspect ratio of the relief structure of the substrate should be raised to acquire a sufficient antireflection performance, and therefore it is undesirable because manufacturing becomes difficult. In a structure to apply the refractive index gradient, necessary thickness as the antireflection structure is about 1/2λ as described above. Moreover, its integral multiples λ, 3/2 λ, 2λ . . . may be the thickness as the antireflection structure. In wavelength range of visible light level, if the thickness is about 2λ, the sufficient performance is obtained and any more thickness is not needed, and therefore it is defined as the upper limit value.

$$1/5\lambda \leq D \leq 2\lambda \tag{2}$$

The following conditional expression (3) defines the height of the reliefs of the substrate. m is the number of layers of the thin films. Embodiment satisfies the conditional expression because h0 is 93 nm. Since the number of layers of the thin film in embodiment 1 is two, the height about 1/6λ, where 1/2λ is divided equally among three, is needed as the height of the reliefs of the substrate. About 1/2 the height is defined as the lower limit. In other words, the lower limit of h0 when the number of layers of the thin film is two is about 1/12λ, where 1/2λ is divided equally among six. When the reliefs are small exceeding this lower limit, the sufficient antireflection performance cannot be acquired. In contrast, as to the upper limit, when the relief structure is highly defined than this, it is undesirable because manufacturing becomes difficult. Therefore, it is desirable to be designed not to exceed the upper limit in order to achieve the effect of the thin film layer. Furthermore, if the upper limit of the height in the reliefs of the substrate is defined as of at most 1/3*λ as represented in the following conditional expression (3'), manufacturing of the relief structure further becomes easy.

$$(1/4 \times \lambda)/(m+1) < h0 < 2/5 \times \lambda \tag{3}$$

$$(1/4 \times \lambda)/(m+1) < h0 < 1/3 \times \lambda \tag{3'}$$

In embodiment 1, the formation of relief shape to the substrate becomes easy by designing the relief shape as a taper shape. In particular, this shape becomes it easy to form a shape with the glass molding. This is a structure where the occupancy rate of the medium gradually lowers from the substrate side toward the air side (the amount of the medium decreases from the substrate side toward the air side). The taper shape may be circular conic shape or six-sided pyramid shape other than four-sided pyramid shape in FIG. 4, or those combinations, or other shape.

The following conditional expression (4) defines the aspect ratio of the relief structure formed on the substrate. P is the pitch of the relief structure. When the aspect ratio becomes small exceeding this lower limit, sufficient antireflection performance cannot be acquired. In contrast, exceeding the upper limit is undesirable because manufacturing becomes difficult.

$$0.25 < h0/P < 1.25 \tag{4}$$

Since the aspect ratio 0.67 in embodiment 1 is 1/3 for the aspect ratio 2 of the reliefs of a comparison numerical example, the formation of the relief shape on the surface of the substrate can be formed by the glass molding at the same time as the molding of the lens shape. The antireflection element in embodiment 1 greatly improves the easiness of the molding while having a performance similar to the comparison numerical example.

As the medium of the thin film layer 2 in embodiment 1, $Al_2O_3$ etc. can be selected as a principal ingredient. The medium of the thin film layer 3 can use the porous quality of $SiO_2$ or $MgF_2$ etc.

[Embodiment 2]

Hereinafter, an antireflection structure in embodiment 2 of the present invention is described with reference to FIG. 9.

Figure 9:
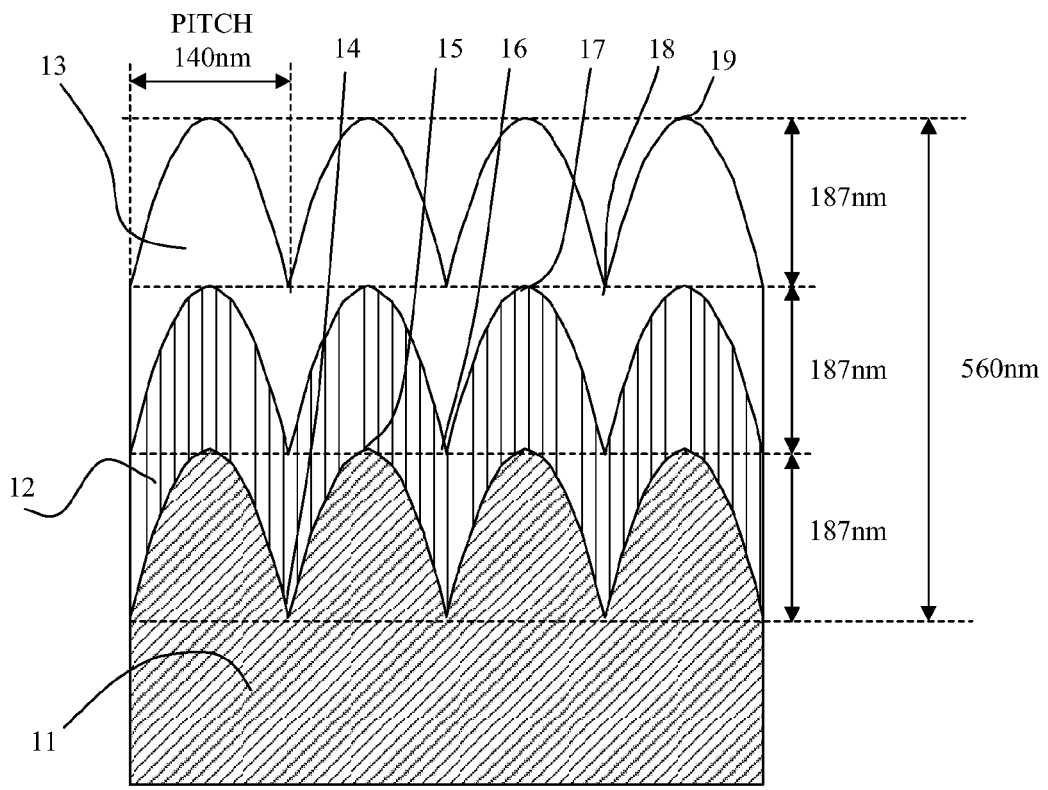
FIG. 9 illustrates an antireflection structure of embodiment 2.

FIG. 9 illustrates a section view of the antireflection structure of the present invention. As with embodiment 1, this is a structure where thin film layers 12 and 13 are layered on a relief structure of a substrate 11.

The relief structure is provided in the substrate 11 with a frequency of at most the wavelength by molding. The thin film 12 and the thin film 13 are formed on the relief structure of the substrate 11 by using sputtering film formation and the like so that the film thickness is uniform.

Table 1 represents designed values of embodiment 2. The substrate 11 is a medium having the refractive index 1.84, and the surface thereof forms reliefs where the pitch is 140 nm and the height is 187 nm. The thin film 12 having the refractive index 1.60 is formed on the reliefs of the substrate 11, and the thin film 13 having a refractive index of 1.25 is formed on the thin film 12, with the thickness 187 nm equal to the height of the reliefs of the substrate 11.

As with embodiment 1, the reliefs of the interface in the upper side of the thin film 13 has the same shape as the reliefs of the substrate 11, and the height thereof is 187 nm equal to the height of the reliefs of the substrate 11.

As the section view of FIG. 9, the total thickness from a bottom 14 of concaves of the relief structure of the substrate 11 to a top 19 of convexes of the interface in the upper side of the thin film 13 is 560 nm. In embodiment 2, the thin film layer 12 is 187 nm, the thin film layer 13 is 187 nm, and the maximum thickness D of the thin film layers is 373 nm. This satisfies the conditions.

Figure 10:
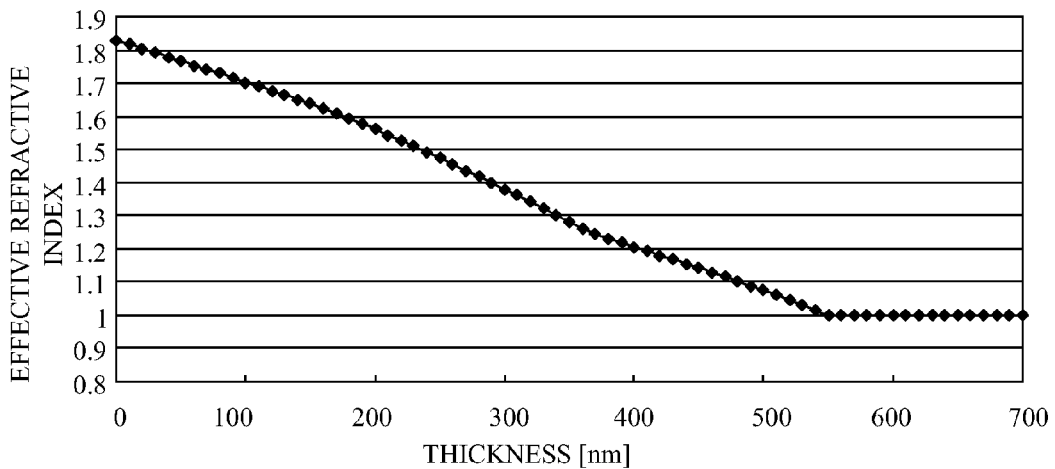
FIG. 10 illustrates a refractive index structure of a numerical example 2 of the present invention.
Figure 11:
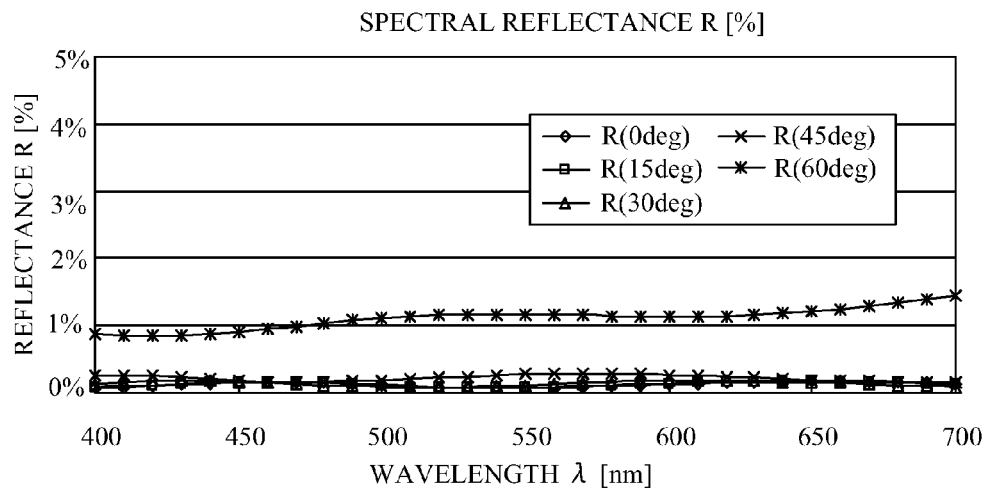
FIG. 11 is a graph illustrating calculation values of the spectral reflectance of the numerical example 2 of the present invention.

As with embodiment 1, a top 15 of convexes of the relief structure of the substrate 11 and a bottom 16 of concaves of an interface in the upper side of the thin film 12 are on the same level. Moreover, a top 17 of convexes of the thin film 12 and a bottom 18 of concaves of the interface in the upper side of the thin film 13 are on the same level. FIG. 10 is a refractive index profile that indicates the effective refractive index in the thickness direction of the substrate with respect to this antireflection structure. The thickness is set in the horizontal axis, and it is plotted by expediently defining as 0 nm the position which is on the same thickness as the bottom 14 of the concaves of the relief structure of the substrate 11. The effective refractive index is set in the vertical axis. As with embodiment 1, as the whole structure, the graph illustrates that, from the substrate side toward the air side, the effective refractive index gradually changes from the refractive index 1.84 of the substrate 11 to the refractive index 1.00 of air. On the basis of this refractive index profile, the result where spectral reflectance is simulated as the multilayer interference is illustrated as the graph of FIG. 11. In the incident angle 0-45°, a low reflectance of 0.2% or less is achieved in the whole range of visible light. Moreover, the super-performance reflectance of about 1% is achieved in a high incident angle of 60°.

[Embodiment 3]

Hereinafter, an antireflection structure in embodiment 3 of the present invention is described with reference to FIG. 12.

Figure 12:
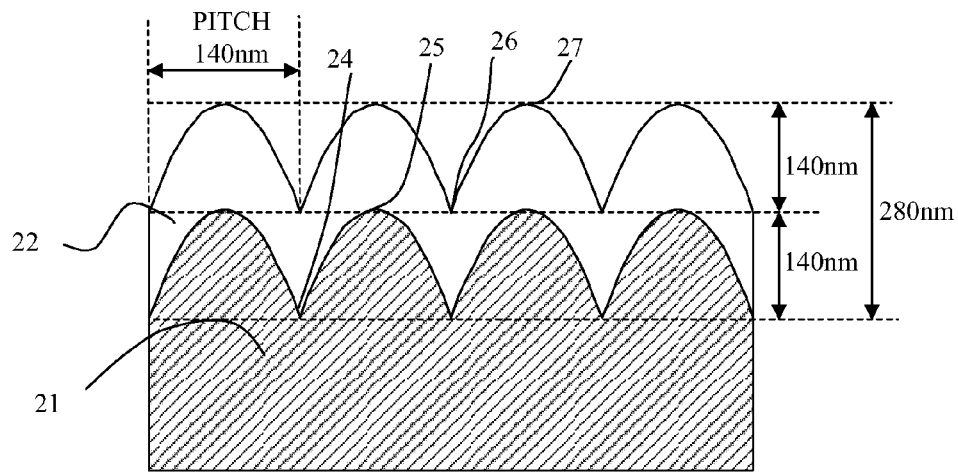
FIG. 12 illustrates an antireflection structure of embodiment 3.

FIG. 12 illustrates a section view of the antireflection structure of the present invention. Embodiments 1 and 2 describes an example when the two thin film layers are provided on the relief structure of the substrate, but embodiment 3 describes an example when the one thin film layer is provided. That is to say, the antireflection structure in embodiment 3 is a structure where only one layer of the thin film layer 22 is formed on the relief structure of a substrate 21.

As with embodiment 1, the relief structure is provided in the substrate 21 with a frequency of at most the wavelength by the molding. A thin film 22 is formed on the relief structure of the substrate 21 by using sputtering film formation so that the film thickness is uniform.

Table 1 represents designed values of embodiment 3. The substrate 21 is a medium having the refractive index 1.84, and the surface thereof forms reliefs where the pitch is 140 nm and the height is 140 nm. The thin film 22 having the refractive index 1.38 is formed on the reliefs of the substrate 21 with the thickness 140 nm equal to the height of the reliefs of the substrate 21.

As with embodiment 1, the reliefs of the interface in the upper side of the thin film 22 has the same shape as the reliefs of the substrate 21, and the height thereof is 140 nm equal to the height of the reliefs of the substrate 21.

As the section view of FIG. 12, the total thickness from a bottom 24 of concaves of the relief structure of the substrate 21 to a top 27 of convexes of the interface in the upper side of the thin film 22 is 280 nm. In embodiment 3, the thin film layer 22 is 140 nm, and the maximum thickness D of the thin film layers is 140 nm. This satisfies the conditions.

As with embodiment 1, a top 25 of convexes of the relief structure of the substrate 21 and a bottom 26 of concaves of an interface in the upper side of the thin film 22 are on the same level.

Figure 13:
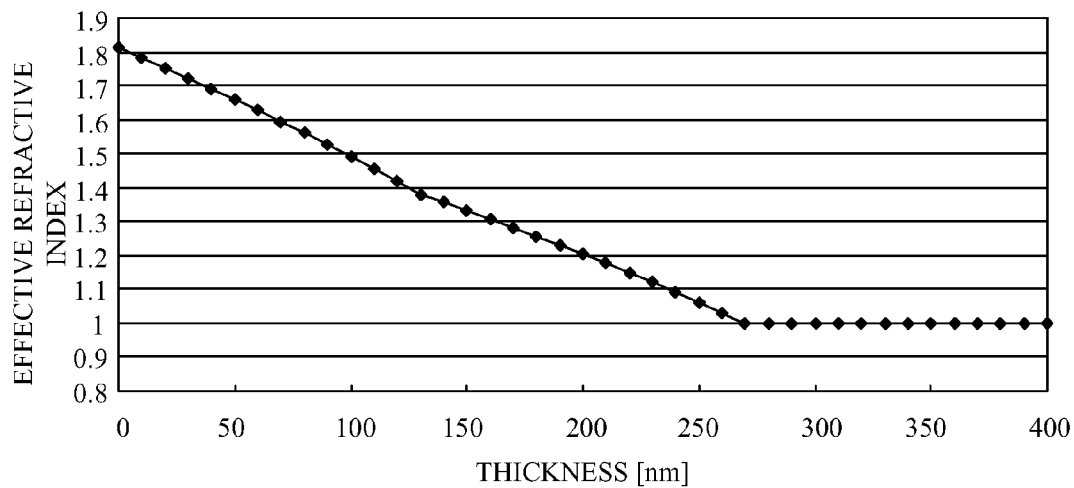
FIG. 13 illustrates a refractive index structure of a numerical example 3 of the present invention.

FIG. 13 is a refractive index profile that indicates the effective refractive index in the thickness direction of the substrate with respect to this antireflection structure. The thickness is set in the horizontal axis, and it is plotted by expediently defining as 0 nm the position which is one the same thickness as the bottom 24 of the concaves of the relief structure of the substrate 21. The effective refractive index is set in the vertical axis. As with embodiment 1, as the whole structure, the graph illustrates that the effective refractive index gradually changes from the refractive index 1.84 of the substrate 21 to the refractive index 1.00 of air.

Figure 14:
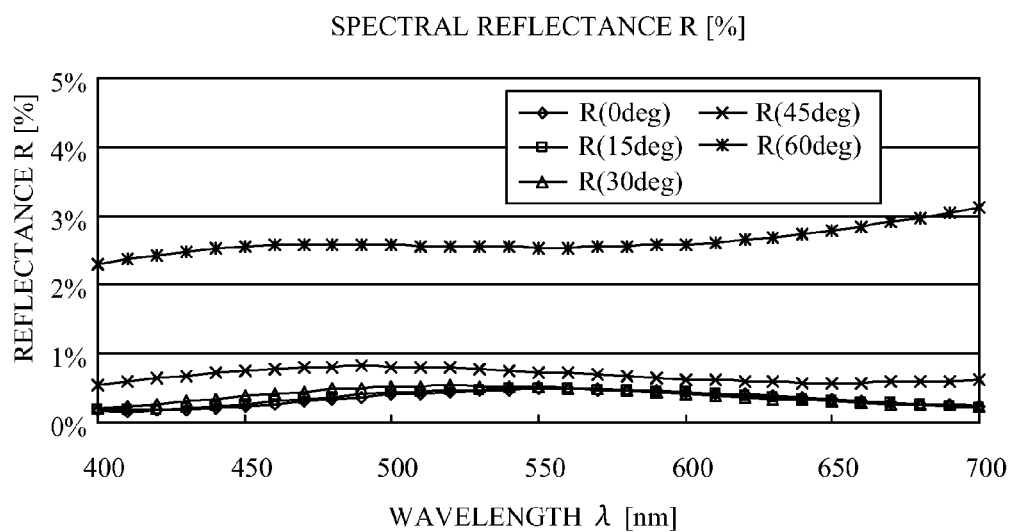
FIG. 14 is a graph illustrating calculation values of the spectral reflectance of the numerical example 3 of the present invention.

On the basis of this refractive index profile, the result where spectral reflectance is simulated as the multilayer interference is illustrated as the graph of FIG. 14. This is nearly similar to embodiment 1. In the incident angle 0-30°, a low reflectance of 0.5% or less is achieved in the whole range of visible light. Moreover, the super-performance reflectance of about 3% is achieved in a high incident angle of 60°.

[Embodiment 4]

Hereinafter, an antireflection structure in embodiment 4 of the present invention is described with reference to FIG. 15.

Figure 15:
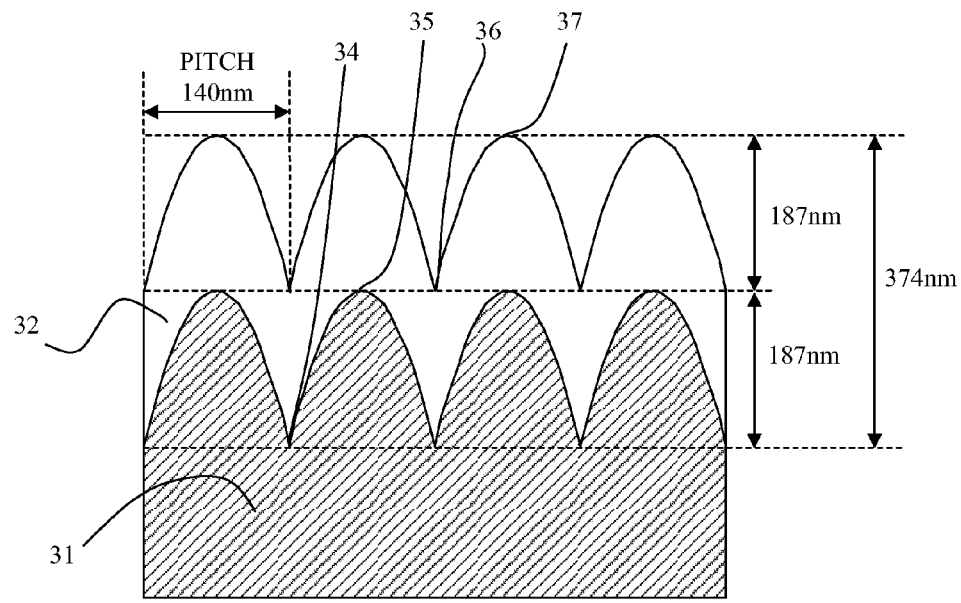
FIG. 15 illustrates an antireflection structure of embodiment 4.

FIG. 15 illustrates a section view of the antireflection structure of the present invention. As with embodiment 3, this is a structure where only one layer of a thin film layer 32 is formed on the relief structure of a substrate 31.

As with embodiment 1, the relief structure is provided in the substrate 31 with a frequency of at most the wavelength by the molding. The thin film 32 is formed on the relief structure of the substrate 31 by using sputtering film formation so that the film thickness is uniform.

Table 1 represents designed values of embodiment 4. The substrate 31 is a medium having the refractive index 1.84, and the surface thereof forms reliefs where the pitch is 140 nm and the height is 187 nm. The thin film 32 having the refractive index 1.38 is formed on the reliefs of the substrate 31 with the thickness 187 nm equal to the height of the reliefs of the substrate 31.

As with embodiment 1, the reliefs of the interface in the upper side of the thin film 32 has the same shape as the reliefs of the substrate 31, and the height thereof is 187 nm equal to the height of the reliefs of the substrate 31.

As the section view of FIG. 15, the total thickness from a bottom 34 of concaves of the relief structure of the substrate 31 to a top 37 of convexes of the interface in the upper side of the thin film 32 is 374 nm. In embodiment 4, the thin film layer 32 is 187 nm, and the maximum thickness D of the thin film layers is 187 nm. This satisfies the conditions.

As with embodiment 1, a top 35 of convexes of the relief structure of the substrate 31 and a bottom 36 of concaves of an interface in the upper side of the thin film 32 are on the same level.

Figure 16:
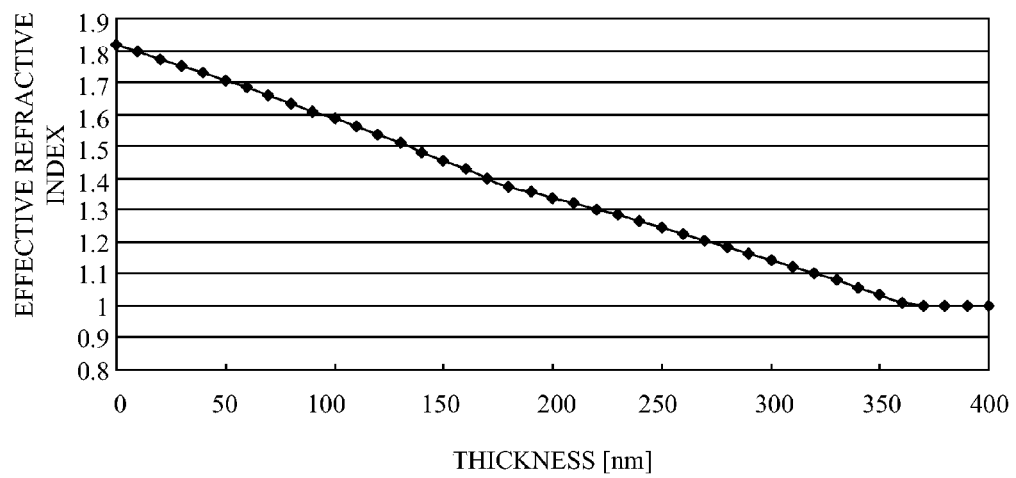
FIG. 16 illustrates a refractive index structure of a numerical example 4 of the present invention.

FIG. 16 is a refractive index profile that indicates the effective refractive index in the thickness direction of the substrate with respect to this antireflection structure. The thickness is set in the horizontal axis, and it is plotted by expediently defining as 0 nm the position as the bottom 34 of the concaves of the relief structure of the substrate 31. The effective refractive index is set in the vertical axis. As with embodiment 1, as the whole structure, the graph illustrates that, from the substrate side toward the air side, the effective refractive index gradually changes from the refractive index 1.84 of the substrate 31 to the refractive index 1.00 of air.

Figure 17:
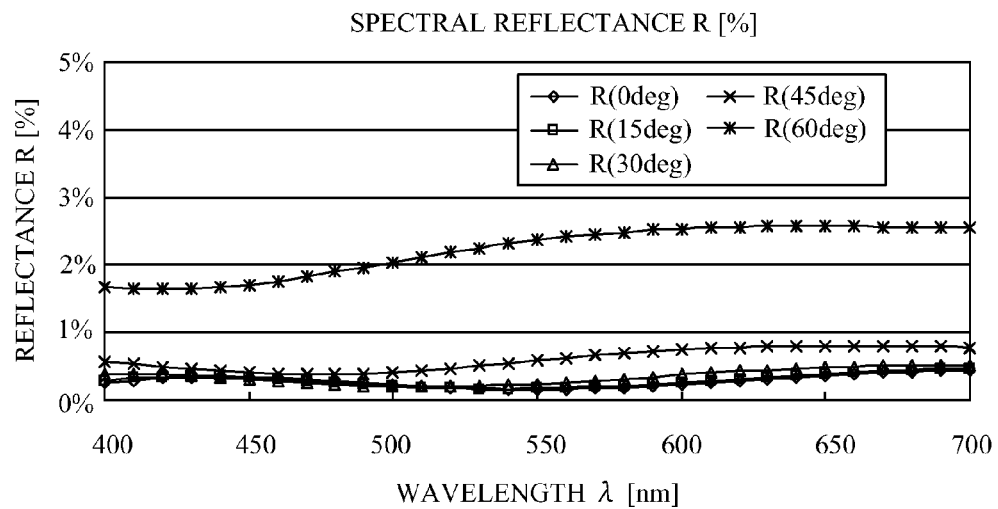
FIG. 17 is a graph illustrating calculation values of the spectral reflectance of the numerical example 4 of the present invention.

On the basis of this refractive index profile, the result where spectral reflectance is simulated as the multilayer interference is illustrated as the graph of FIG. 17. This is nearly similar to embodiment 1. In the incident angle 0-45°, a low reflectance of 0.8% or less is achieved in the whole range of visible light. Moreover, the super-performance reflectance of about 2.5% is achieved in a high incident angle of 60°.

[Embodiment 5]

Hereinafter, an antireflection structure in embodiment 5 of the present invention is described with reference to FIG. 18.

Figure 18:
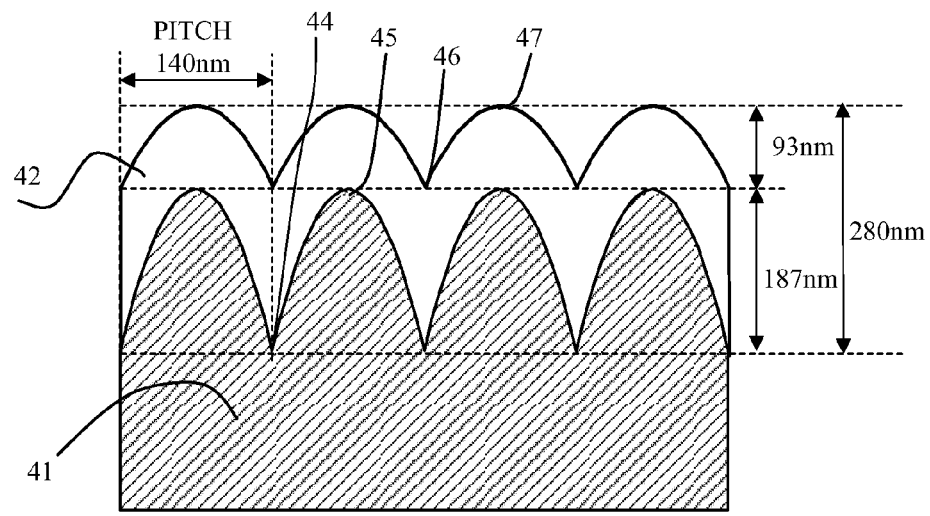
FIG. 18 illustrates an antireflection structure of embodiment 5.

FIG. 18 illustrates a section view of the antireflection structure of the present invention. As with embodiments 3 and 4, this is a structure where only one layer of a thin film layer 42 is formed on the relief structure of a substrate 41.

As with other embodiments, the relief structure is provided in the substrate 41 with a frequency of at most the wavelength by the molding. The thin film 42 is formed on the relief structure of the substrate 41, but the thin film is formed by using sputtering film formation so that the film thickness is thick in concave parts of the reliefs and is thin in convex parts of the reliefs.

Table 1 represents designed values of embodiment 5. The substrate 41 is a medium having the refractive index 1.84, and the surface thereof forms reliefs where the pitch is 140 nm and the height is 187 nm. The thin film 42 having the refractive index 1.30 is formed on the reliefs of the substrate 41 in the concave parts with the thickness equal to the height of the reliefs of the substrate 41 and in the convex parts with the thickness 93 nm thinner than the concave parts.

Embodiment 5 is different from embodiments 1-4, and the reliefs of an interface in the upper side of the thin film 42 has the height different from the reliefs of the substrate 41 while having a shape nearly similar to the reliefs of the thin film 41. The height of the reliefs in the substrate 41 is 187 nm, but the height of the reliefs in the substrate 42 is 93 nm, which is half as much as the substrate 41.

As the section view of FIG. 18, the total thickness from a bottom 44 of concaves of the relief structure of the substrate 41 to a top 47 of convexes of the interface in the upper side of the thin film 42 is 280 nm. In embodiment 5, Da is 93 nm and Db is 187 nm in the thin film layer 42, and the maximum thickness D of the thin film layers is 187 nm. This satisfies the conditions.

As with embodiments 1-4, a top 45 of convexes of the relief structure of the substrate 41 and a bottom 46 of concaves of an interface in the upper side of the thin film 42 are on the same level.

Figure 19:
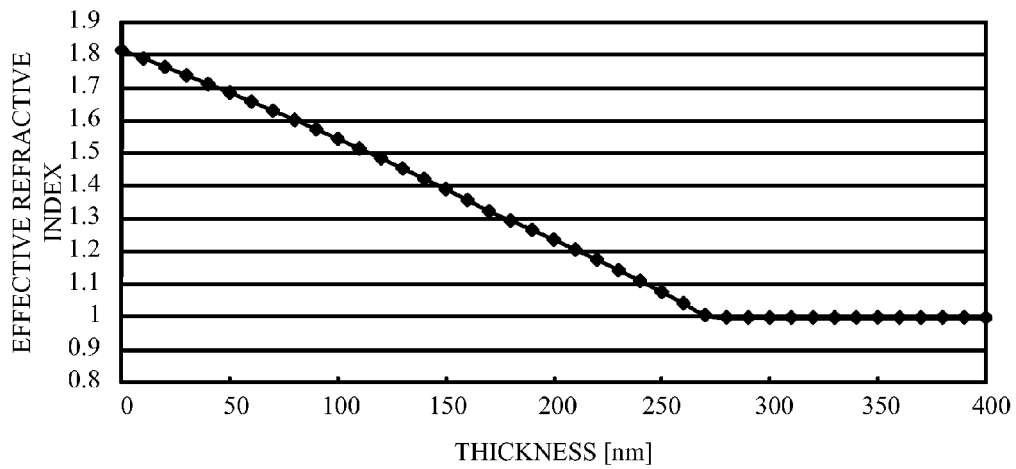
FIG. 19 illustrates a refractive index structure of a numerical example 5 of the present invention.

FIG. 19 is a refractive index profile that indicates the effective refractive index in the thickness direction of the substrate with respect to this antireflection structure. The thickness is set in the horizontal axis, and it is plotted by expediently defining as 0 nm the position which is on the same thickness as the bottom 44 of the concave of the relief structure of the substrate 41. The effective refractive index is set in the vertical axis. As with embodiment 1, as the whole structure, the graph illustrates that, from the substrate side toward the air side, the effective refractive index gradually changes from the refractive index 1.84 of the substrate 41 to the refractive index 1.00 of air.

Figure 20:
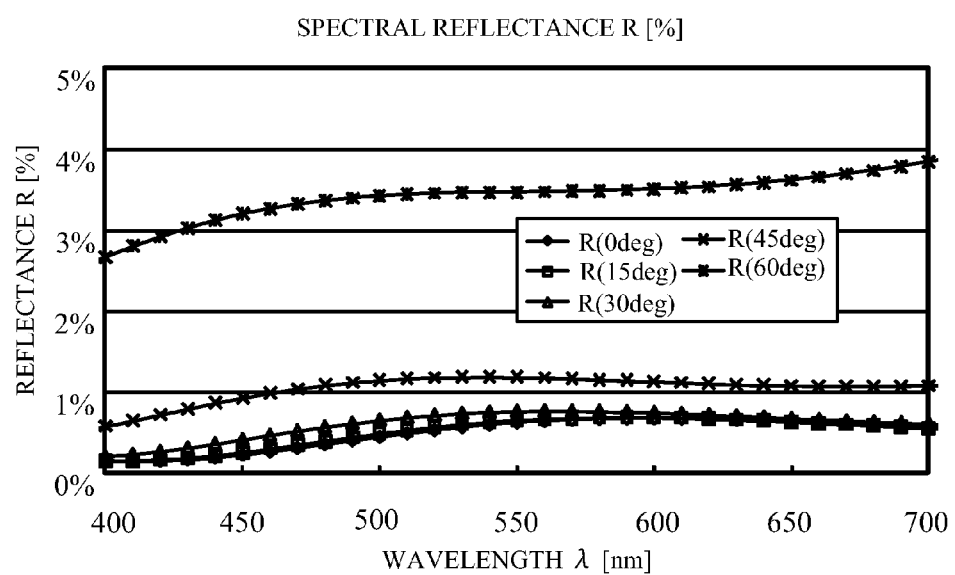
FIG. 20 is a graph illustrating calculation values of the spectral reflectance of the numerical example 5 of the present invention.

On the basis of this refractive index profile, the result where spectral reflectance is simulated as the multilayer interference is illustrated as the graph of FIG. 20. This is more or less similar to embodiment 1. In the incident angle 0-30°, a low reflectance of 0.8% or less is achieved in the whole range of visible light. Moreover, the super-performance antireflection characteristic of about 3.5% is achieved in a high incident angle of 60°.

[Embodiment 6]

Hereinafter, an antireflection structure in embodiment 6 of the present invention is described with reference to FIG. 21.

Figure 21:
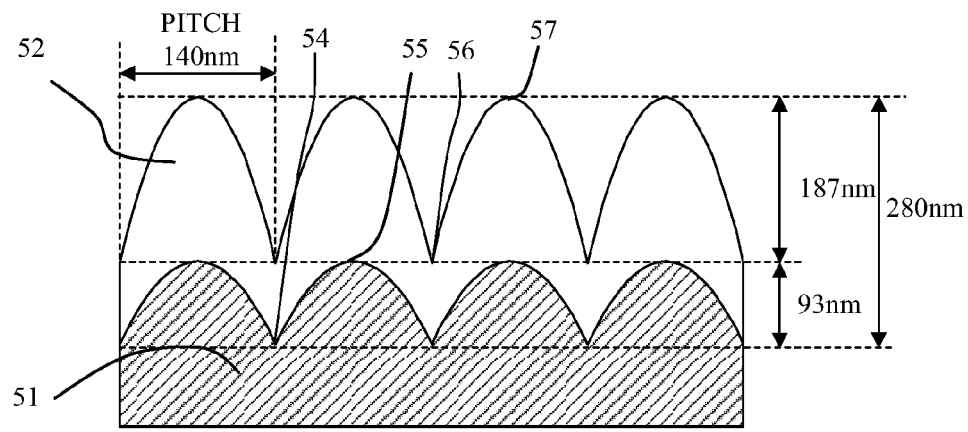
FIG. 21 illustrates an antireflection structure of embodiment 6.

FIG. 21 illustrates a section view of the antireflection structure of the present invention. As with embodiment 5, this is a structure where only one layer of a thin film layer 52 is formed on the relief structure of a substrate 51.

As with other embodiments, the relief structure is provided in the substrate 51 with a frequency of at most the wavelength by the molding. The thin film 52 is formed on the relief structure of the substrate 51, but the thin film is formed by using sputtering film formation so that the film thickness is thin in concave parts of the reliefs and is thick in convex parts of the reliefs.

Table 1 represents designed values of embodiment 6. The substrate 51 is a medium having the refractive index 1.60, and the surface thereof forms reliefs where the pitch is 140 nm and the height is 93 nm. The thin film 52 having the refractive index 1.38 is formed on the reliefs of the substrate 51 in the concave parts with the thickness 93 nm equal to the height of the reliefs of the substrate 51 and in the convex parts with the thickness 187 nm thicker than the concave parts.

As with embodiment 5, in embodiment 6, the reliefs of an interface in the upper side of the thin film 52 have the different from the reliefs of the substrate 51 while having a shape nearly similar to the reliefs of the thin film 51. The height of the reliefs in the substrate 51 is 93 nm, but the height of the reliefs in the substrate 52 is 187 nm, which is twice as much as the substrate 51.

As the section view of FIG. 21, the total thickness from a bottom 54 of concaves of the relief structure of the substrate 51 to a top 57 of convexes of the interface in the upper side of the thin film 52 is 280 nm. In embodiment 6, Da is 187 nm and Db is 93 nm in the thin film layer 53, and the maximum thickness D of the thin film layers is 187 nm. This satisfies the conditions.

As with embodiments 1-5, a top 55 of convexes of the relief structure of the substrate 51 and a bottom 56 of concaves of an interface in the upper side of the thin film 52 are on the same level.

Figure 22:
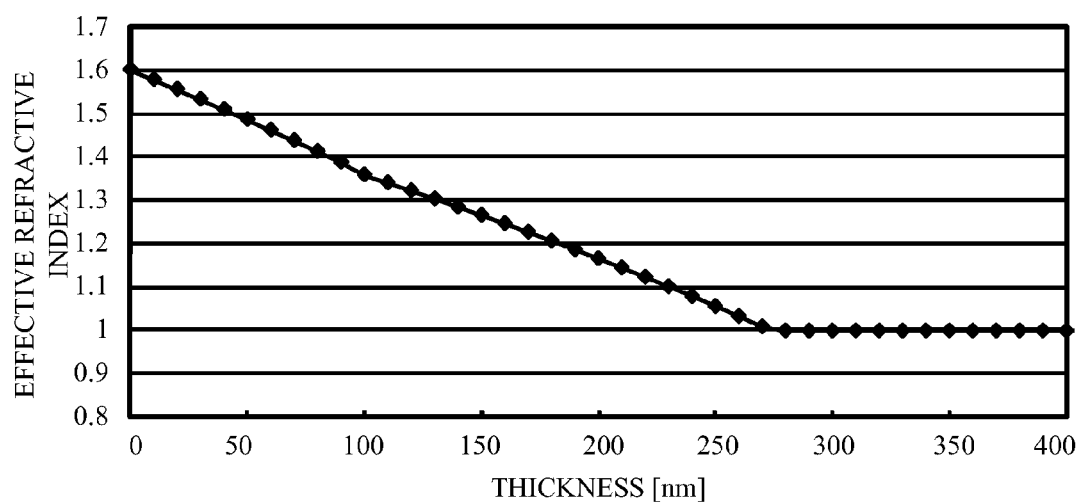
FIG. 22 illustrates a refractive index structure of a numerical example 6 of the present invention.

FIG. 22 is a refractive index profile that indicates the effective refractive index in the thickness direction of the substrate with respect to this antireflection structure. The thickness is set in the horizontal axis, and it is plotted by expediently defining as 0 nm the position which is on the same thickness as the bottom 54 of the concaves of the relief structure of the substrate 51. The effective refractive index is set in the vertical axis the vertical axis. As the whole structure, the graph illustrates that, from the substrate side toward the air side, the effective refractive index gradually changes from the refractive index 1.60 of the substrate 51 to the refractive index 1.00 of air.

Figure 23:
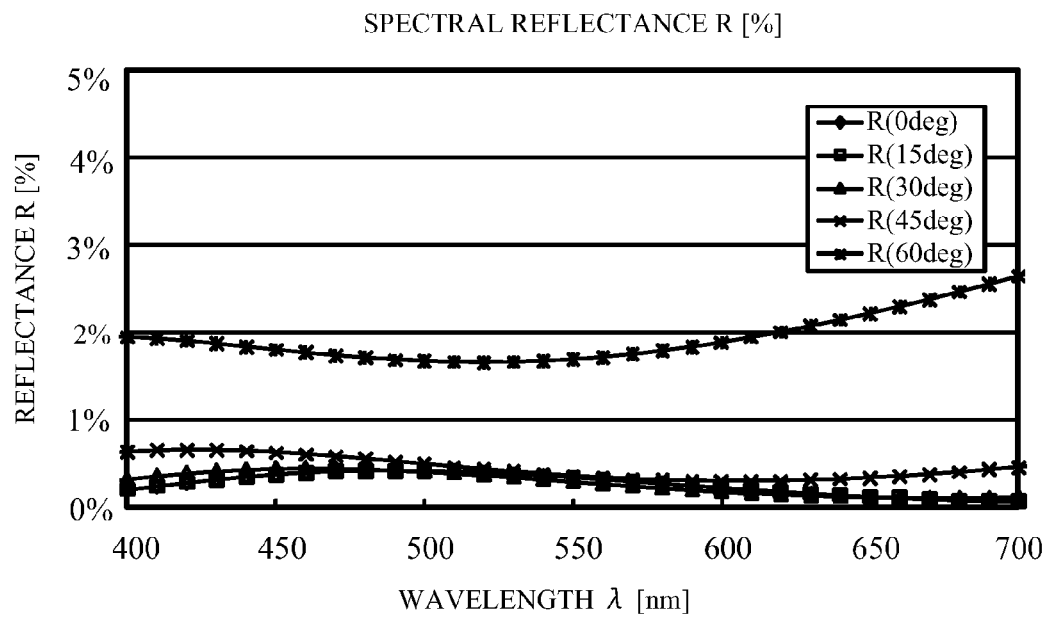
FIG. 23 is a graph illustrating calculation values of the spectral reflectance of the numerical example 6 of the present invention.

On the basis of this refractive index profile, the result where spectral reflectance is simulated as the multilayer interference is illustrated as the graph of FIG. 23. This is more or less similar to embodiment 1. In the incident angle 0-45°, a low reflectance of 0.8% or less is achieved in the whole range of visible light. Moreover, the super-performance antireflection characteristic of about 2.5% is achieved in a high incident angle of 60°.

Figure 24:
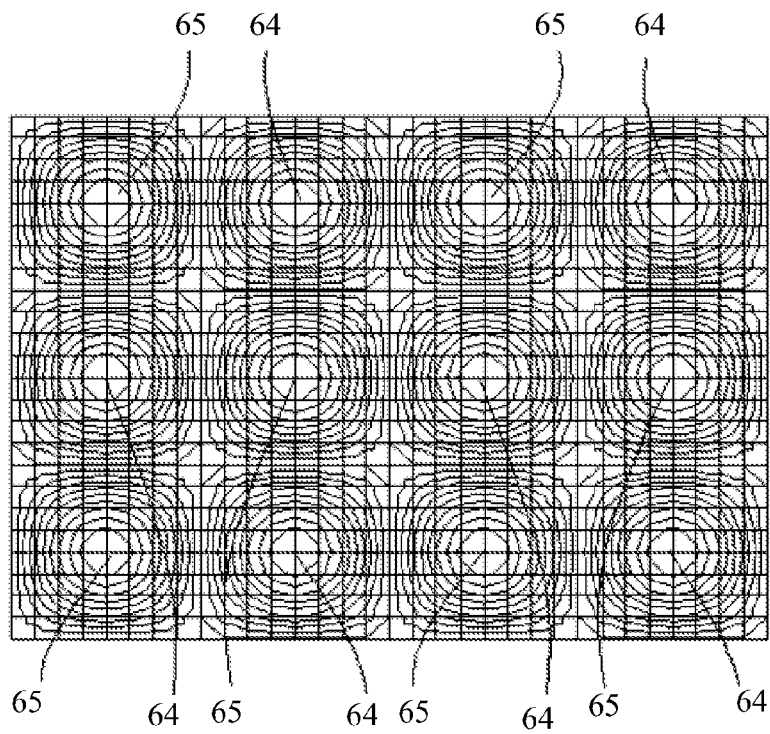
FIG. 24 is a schematic diagram (contour drawing from up above) illustrating an example of the relief structure of the present invention.
Figure 25:
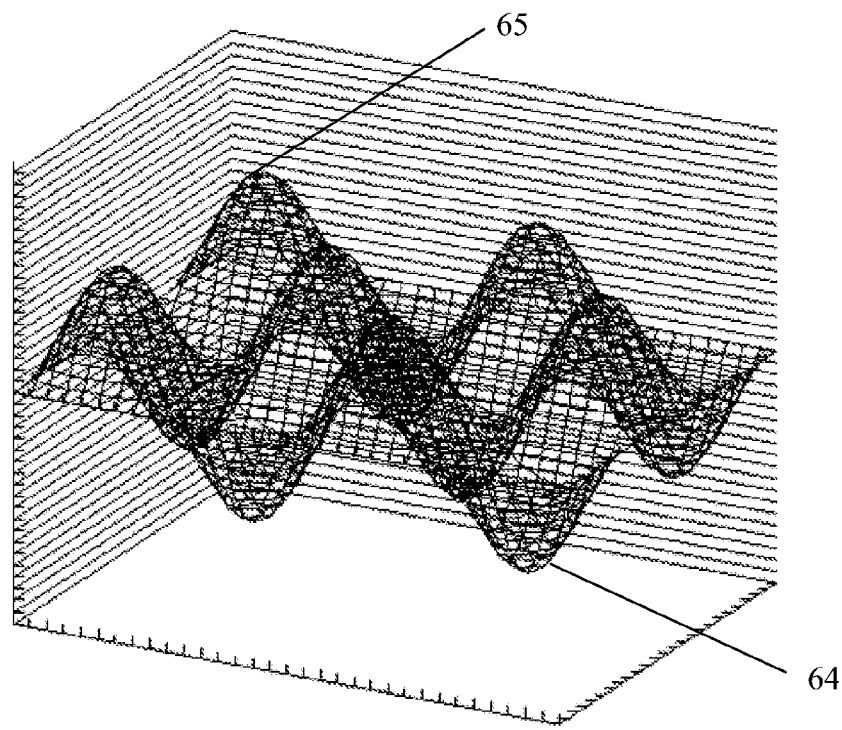
FIG. 25 is a schematic diagram (view from oblique direction) illustrating the example of the relief structure of the present invention.

In embodiments 1-6, the relief structure is described with a shape where the convex shape is arrayed as if a bell shape is arrayed as illustrated in FIG. 4, but it may be further a shape where the concave shape and the convex shape are alternately arrayed as illustrated in FIG. 24 or 25. FIG. 25 is a schematic view from oblique direction, and a contour drawing viewing it from up above is illustrated as FIG. 24. In FIG. 24, the numerical sign 65 represents tops of the convex shape. The numerical sign 64 represents bottoms of the concave shape. It may be further a shape where FIG. 4 is inverted (not shown). In each case, it is configured so that the filing rate of the substrate medium lineally decreases from the substrate side toward air.

As to the pitch of the relief structure, it is preferred to be formed by 140 nm or less because scattering due to the diffraction can be prevented. However, in some usage, it is also possible to expand the pitch about from 160 nm to 200 nm for the easiness of manufacturing by allowing the scattering. In that case, it is required to calculate the spectral reflectance by using not approximation due to the effective refractive index but RCWA method (Rigorous Coupled Wave Analysis) and the like. On the basis of the calculation, it is possible to optimally correct the designed value of embodiment.

Figure 26:
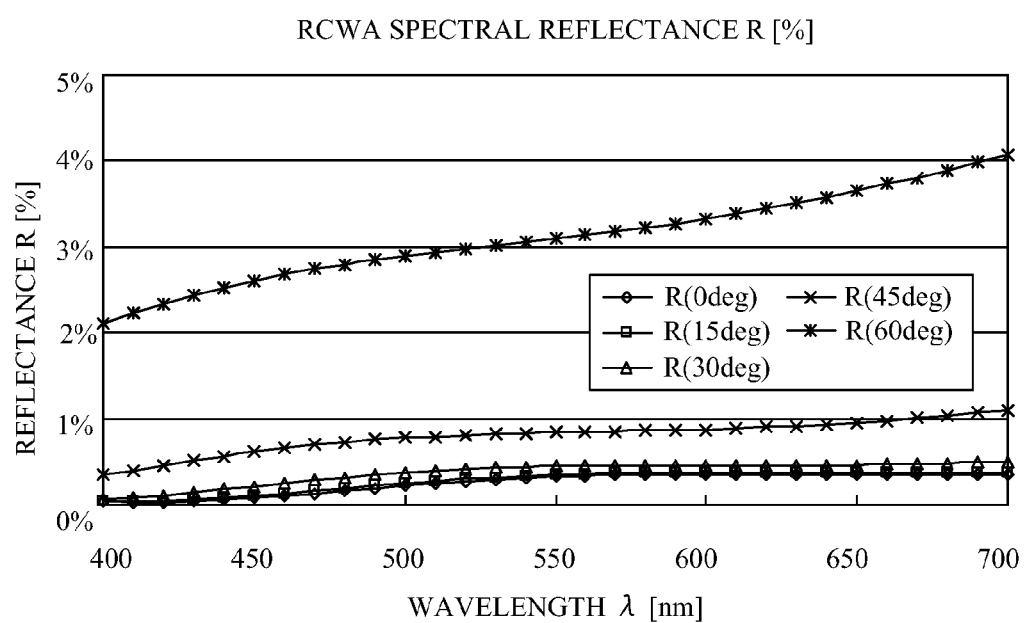
FIG. 26 is a graph illustrating calculation values of the spectral reflectance with RCWA of the numerical example 1 of the present invention.

As to embodiment 1, the calculation result by RCWA method is illustrated in FIG. 26. Since the pitch is 140 nm, there is no influence of diffraction, and it almost corresponds to the spectral reflectance calculation by the effective refractive index of FIG. 3. All embodiments 1-6 design by using things due to the thin film calculation by the effective refractive index.

The substrates of the present invention, having the antireflection structures, are not limited to plane surface, and can be applied to at least one surface of optical surfaces of sphere surface, aspheric surface, Fresnel surface, free-form surface, and the like in a lens.

In an antireflection element having fine reliefs with frequency of at most the wavelength, the present invention can provide a structure of antireflection element having a wide incident angle characteristic with wide band while making a product easy by lowering the aspect ratio of the reliefs.

As above, while the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, in embodiments 1 and 2, the number of layers of thin films provided on the relief structure of the substrate is not limited to two layers, and about three to five layers, being two or more layers, may be provided by changing the height of the reliefs of the substrate, the thickness of the thin films, and the refractive index of the substrate or the thin films. Moreover, in embodiments 3 and 4, the number of layers of the thin films provided on the relief structure of the substrate is not limited to one layer, about three to five layers, being one or more layer, may be provided by changing the height of the reliefs of the substrate, the thickness of the thin films, and the refractive index of the substrate or the thin films.

TABLE 1

| Substrate no | h0 [nm] | n1 | h1 [nm] | n2 | h2 [nm] |
|---|---|---|---|---|---|
| Embodiment 1 | 1.84 | 93 | 1.60 | 93 | 1.25 | 93 |
| Embodiment 2 | 1.84 | 187 | 1.60 | 187 | 1.25 | 187 |
| Embodiment 3 | 1.84 | 140 | 1.38 | 140 | — | — |
| Embodiment 4 | 1.84 | 187 | 1.38 | 187 | — | — |
| Embodiment 5 | 1.84 | 187 | 1.30 | 93 | — | — |
| Embodiment 6 | 1.60 | 93 | 1.38 | 187 | — | — |

This application claims the benefit of Japanese Patent Application No. 2010-205284, filed on Sep. 14, 2010, which is hereby incorporated by reference herein in its entirety.

What is claimed is:

1. An optical element having an antireflection function, the optical element comprising:
a substrate including a first relief structure including a plurality of convexes and a plurality of concaves arrayed with a pitch of at most a half of a wavelength $\lambda$; and
a thin film layer including at least one thin film on the first relief structure,
wherein the at least one thin film each has a refractive index lower than a refractive index of the substrate,
wherein a thin film closest to a side of air, among the at least one thin film, includes a second relief structure corresponding to the first relief structure,
wherein a thin film closest to a side of the substrate, among the at least one thin film, includes a third relief structure corresponding to the first relief structure,
wherein a height of a bottom of the third relief structure is the same or higher than that of a top of the first relief structure in a normal direction of a bottom plane of the first relief structure, and
wherein the following conditional expressions are satisfied:

$$1/4 \leq h1/h0 \leq 2 \ldots, \quad (1)$$

and $$1/5\lambda \leq D \leq 2\lambda \ldots, \quad (2)$$

where h0 represents a first height difference between the top and a bottom of the first relief structure in the normal direction, h1 represents a second height difference between a top and a bottom of the second relief structure in the normal direction, D represents a maximum thickness of the thin film layer, and the wavelength $\lambda$ is 550 nm.

2. The optical element according to claim 1, wherein the top of the first relief structure and the bottom of the third relief structure are at the same level in the normal direction.

3. The optical element according to claim 1, wherein the first height difference is equal to a thickness of the at least one thin film.

4. The optical element according to claim 1, wherein the thin film layer includes a plurality of thin films.

5. The optical element according to claim 4, wherein the plurality of thin films are arranged in order of a decreasing reflective index from the side of the substrate toward the side of air.

6. The optical element according to claim 1, wherein the first relief structure satisfies the following conditional expression:

$$0.25 < h0/P < 1.25,$$

where P represents a pitch of the first relief structure.

7. An optical element comprising:
a substrate including a first relief structure including a plurality of convexes and a plurality of concaves;

a thin film layer including at least a first thin film, on the first relief structure, the thin film layer having a reflective index lower than a refractive index of the substrate,
wherein the thin film layer includes a second relief structure corresponding to the first relief structure on a farthest side from the substrate,
wherein the thin film layer includes an adjacent thin film closest to a substrate side,
wherein the adjacent thin film is one of the first thin film or a second thin film disposed closest to the substrate side and having a thickness sufficient to occupy at least a space between a surface connecting bottoms of the first relief structure and a surface connecting tops of the first relief structure, and
wherein the following conditional expressions are satisfied:

$$1/4 \leq h1/h0 \leq 2,$$

and $$1/5\lambda \leq D \leq 2\lambda,$$

where $h0$ represents a height difference between the surface connecting the tops of the first relief structure and the surface connecting the bottoms of the first relief structure, $h1$ represents a height difference between a surface connecting tops of the second relief structure and a surface connecting bottoms of the second relief structure, D represents a maximum thickness of the thin film layer, and the wavelength $\lambda$ is 550 nm.

8. The optical element according to claim 7, wherein:
the first thin film is the adjacent thin film, and
the surface connecting bottoms of the second relief structure is the same or higher than the surface connecting the tops of the first relief structure.

9. The optical element according to claim 7, wherein:
the thin film layer includes a plurality of thin films, including the second thin film, which is the adjacent thin film,
the second thin film includes a third relief structure corresponding to the first relief structure, and
a surface connecting bottoms of the third relief structure is the same or higher than the surface connecting the tops of the first relief structure.

10. The optical element according to claim 7, wherein:
the thin film layer includes a plurality of thin films, including the second thin film, and
the plurality of thin films are arranged in order of a decreasing refractive index from the substrate side.

11. The optical element according to claim 7, wherein an area occupied by the first relief structure, between the surface connecting the bottoms of the first relief structure and the surface connecting the tops of the first relief structure, decreases from the surface connecting the bottoms of the first relief structure to the surface connecting the tops of the first relief structure.

12. The optical element according to claim 11, wherein:
the thin film layer includes a plurality of thin films, including the second thin film, which is the adjacent thin film,
the second thin film includes a third relief structure corresponding to the first relief structure, and
a surface connecting bottoms of the third relief structure is the same or higher than the surface connecting the tops of the first relief structure.

13. The optical element according to claim 7, wherein, when a pitch of the concaves and the convexes of the first relief structure is defined as P, the following conditional expression is satisfied:

$$0.25 < h0/P < 1.25.$$

14. The optical element according to claim 13, wherein the pitch P is less than half of the wavelength $\lambda$.

* * * * *